（12）United States Patent
Kulkarni et al.

(10) Patent No.: US 10,008,967 B2
(45) Date of Patent: Jun. 26, 2018

(54) CLOSED LOOP FLUX WEAKENING FOR PERMANENT MAGNET SYNCHRONOUS MOTORS

(71) Applicant: Microchip Technology Incorporated, Chandler, AZ (US)

(72) Inventors: Prasad Kulkarni, Bengaluru (IN); Ramesh Kankanala, Bengaluru (IN); Debraj Deb, Bengaluru (IN)

(73) Assignee: Microchip Technology Inc., Chandler, AZ (US)

( * ) Notice: Subject to any disclaimer, the term of this patent is extended or adjusted under 35 U.S.C. 154(b) by 18 days.

(21) Appl. No.: 15/333,249

(22) Filed: Oct. 25, 2016

(65) Prior Publication Data

US 2018/0115267 A1  Apr. 26, 2018

(51) Int. Cl.
*H02P 21/00* (2016.01)
*H02P 21/14* (2016.01)

(52) U.S. Cl.
CPC ........ *H02P 21/141* (2013.01); *H02P 21/0089* (2013.01)

(58) Field of Classification Search
CPC ........................... H02P 21/141; H02P 21/0089
USPC ..................................................... 318/400.02
See application file for complete search history.

(56) References Cited

U.S. PATENT DOCUMENTS

| 6,965,212 | B1 | 11/2005 | Wang et al. | |
|---|---|---|---|---|
| 2008/0224651 | A1* | 9/2008 | Schulz | H02P 21/0089 318/812 |
| 2013/0009575 | A1* | 1/2013 | Yoo | H02P 21/06 318/400.02 |
| 2014/0132200 | A1* | 5/2014 | Yoo | H02P 21/14 318/798 |
| 2016/0254769 | A1* | 9/2016 | Ren | H02P 9/105 290/44 |

FOREIGN PATENT DOCUMENTS

EP          0631373 A2      12/1994

* cited by examiner

*Primary Examiner* — Eduardo Colon Santana
*Assistant Examiner* — Gabriel Agared
(74) *Attorney, Agent, or Firm* — Burr & Forman LLP; Ryan M. Corbett

(57) ABSTRACT

A closed loop flux weakening method and apparatus are provided. The closed loop flux weakening apparatus may include a difference circuit that obtains a difference between a q-axis reference voltage and a q-axis voltage, a controller that converts the difference between the q-axis reference voltage and the q-axis voltage into a d-axis current of a stator of the motor, and a summation circuit that obtains a d-axis reference current by adding the d-axis current of the stator of the motor and a feed forward d-axis current of the stator of the motor.

10 Claims, 4 Drawing Sheets

CLOSED LOOP FLUX WEAKENING FOR PERMANENT MAGNET SYNCHRONOUS MOTORS

TECHNICAL FIELD

The present disclosure relates generally to a closed loop flux weakening method and apparatus, and more particularly to a closed loop flux weakening method and apparatus that provides energy savings for permanent magnet synchronous motors.

SUMMARY

Permanent magnet synchronous motors (PMSMs) are used in a variety of devices, such as washing machines, electric vehicles, refrigerators, and air compressors. Many of these applications require the PMSMs to operate beyond the nominal speed, which is the maximum speed of the motor limited by voltage without flux weakening, for an extended period of time. Operating beyond the nominal speed requires the motor to operate in an inefficient flux weakening zone or field weakening zone.

Multiple solutions have been proposed for controlling the motor in the flux weakening zone. FIG. 1 shows a block diagram of a control circuit for a PMSM. Referring to FIG. 1, the d-axis reference current $I_{dref}$ 100 is input into a first difference circuit 105 as part of the circuit for controlling the operation of the motor 110. The d-axis reference current $I_{dref}$ may be determined in a variety of ways. For example, the d-axis reference current $I_{dref}$ may be determined using a lookup table (LUT) that provides the d-axis reference current $I_{dref}$ for various motor speeds. However, this method requires operating the motor at different speeds to determine the d-axis reference current $I_{dref}$ in order to generate the LUT. In addition, a different LUT is needed for each different type of motor that is to be controlled.

As an alternative to LUTs, the d-axis reference current $I_{dref}$ may be determined using an open loop equation, as described by R. Krishnan, *PMSM Flux Weakening Operation*, Permanent Magnet Synchronous and Brushless DC Motor Drives, CRC 2010 (http://www.eecs.ucfedu/~tomwu/course/ee16208/notes/27% 20PMSM % 20Flux % 20Weakening % 20Operation.pdf), which is incorporated herein by reference. However, in an open loop approach, there is no indication whether the calculated d-axis reference current $I_{dref}$ is accurate.

As yet another alternative, a closed loop system may be used to determine the d-axis reference current $I_{dref}$. Many of such closed loop systems use the maximum voltage of the motor $V^2_{max}$ without any feed forward input to calculate the d-axis reference current $I_{dref}$. However, this approach requires significant efforts to tune the controller based on the motor variants. Accordingly, an improved control circuit that accurately determines the d-axis reference current $I_{dref}$ without requiring significant manual tuning is needed. Moreover, the LUT, open loop equation, and closed loop systems that do not use feed forward input to calculate the d-axis reference current $I_{dref}$ have limited efficiency, and therefore a more efficient control circuit is needed.

According to an aspect of one or more exemplary embodiments, there is provided an apparatus for generating a reference current used for controlling a motor. The apparatus may include a difference circuit that obtains a difference between a q-axis reference voltage and a q-axis voltage, a controller that converts the difference between the q-axis reference voltage and the q-axis voltage into a d-axis current of a stator of the motor, and a summation circuit that obtains a d-axis reference current by adding the incremental d-axis current of the stator of the motor and a feed forward d-axis current of the stator of the motor.

The q-axis reference voltage, $V_{qref}$, may be determined based on the following equation: $V_{qref} = \sqrt{V_{max}^2 - V_d^2}$; wherein $V_{max}^2$ is the square of a maximum voltage that can be applied to the motor; and wherein $V_d^2$ is the square of a d-axis voltage of the motor.

The feed forward d-axis current of the stator of the motor, $I_{ds\_feedfw}$ may be determined based on the following equation:

$$I_{ds\_feedfw} = \frac{V_{q\,ref} - \left(r_s \times i_{q\,ref} + L_{qs} \times \frac{di_{q\,ref}}{dt} + E\right)}{\omega \times L_{ds}};$$

wherein, $r_s$ is a stator resistance of the motor, $i_{q\,ref}$ is a q-axis reference current, $L_{qs}$ is a q-axis inductance of the stator of the motor, $$\frac{di_{q\,ref}}{dt}$$

is the derivative of the q-axis reference current with respect to time, E is the back electromotive force of the motor, ω is the electrical speed of the motor, and $L_{ds}$ is the d-axis inductance of the stator of the motor. In practice, a low pass digital filter may be used to determine $$\frac{di_{q\,ref}}{dt}$$

and E, depending on the application.

The difference circuit may receive the q-axis reference voltage at a positive input of the difference circuit and receives the q-axis voltage at a negative input of the difference circuit.

According to another aspect of one or more exemplary embodiments, there is provided an apparatus for generating a reference current used for controlling a motor. The apparatus may include a difference circuit that obtains a difference between a q-axis reference voltage and a q-axis voltage, a controller that converts the difference between the q-axis reference voltage and the q-axis voltage into an incremental q-axis voltage of a stator of the motor, a gate that converts the q-axis voltage of the stator of the motor into an incremental d-axis current of a stator of the motor, and a summation circuit that obtains a d-axis reference current by adding the d-axis current of the stator of the motor and a feed forward d-axis current of the stator of the motor.

According to another aspect of one or more exemplary embodiments, there is provided a method for generating a reference current used for controlling a motor. The method may include obtaining a difference between a q-axis reference voltage and a q-axis voltage of the motor, converting the difference between the q-axis reference voltage and the q-axis voltage into a d-axis current of a stator of the motor, and determining a d-axis reference current by adding the incremental d-axis current of the stator of the motor and a feed forward d-axis current of the stator of the motor.

DETAILED DESCRIPTION OF EXEMPLARY EMBODIMENTS

Figure 1:
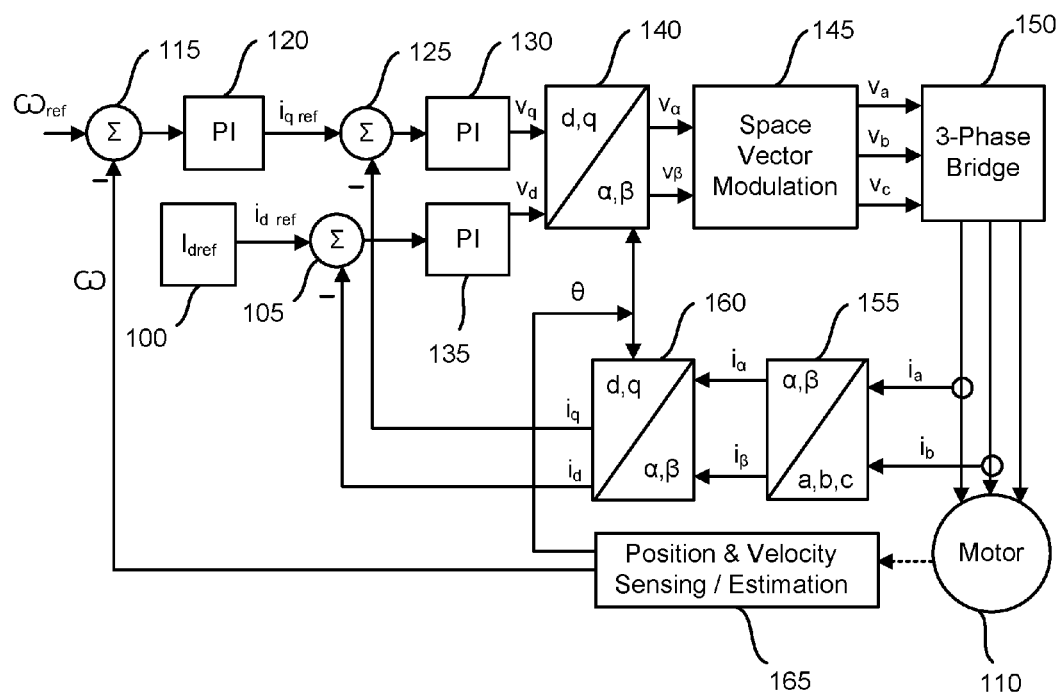
FIG. 1 shows a block diagram of a control circuit for a PMSM according to one or more exemplary embodiments.

Reference will now be made in detail to the following exemplary embodiments, which are illustrated in the accompanying drawings, wherein like reference numerals refer to like elements throughout. The exemplary embodiments may be embodied in various forms without being limited to the exemplary embodiments set forth herein. Descriptions of well-known parts are omitted for clarity.

Figure 2:
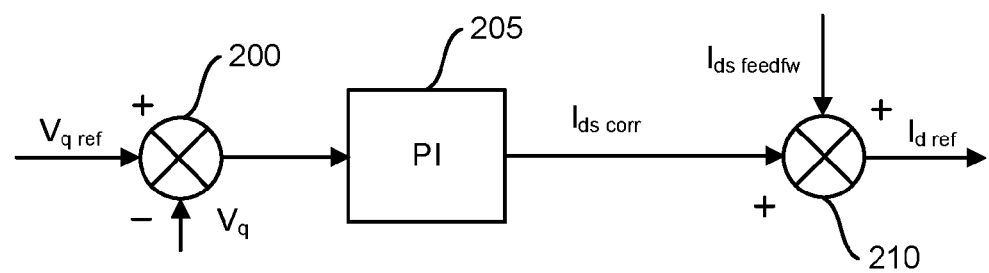
FIG. 2 shows a closed loop flux weakening circuit for determining the d-axis reference current $I_{dref}$ according to an exemplary embodiment.

FIG. 2 shows a closed loop flux weakening circuit for determining the d-axis reference current $I_{dref}$ according to an exemplary embodiment. Referring to FIGS. 1 and 2, the q-axis reference voltage $V_{q\_ref}$ and a q-axis voltage $V_q$ are input to a difference circuit 200, which outputs the difference between the q-axis reference voltage $V_{q\_ref}$ and the q-axis voltage $V_q$ to a PI controller 205. The PI controller 205 may be a PI controller that is well known in the art, and a description of the functionality thereof is omitted here to avoid obscuring other aspects of the disclosure. The PI controller 205 receives the difference between the q-axis reference voltage $V_q$ ref and a q-axis voltage $V_q$ and outputs a corrective d-axis current of the stator of the motor, $I_{ds\_corr}$. A summation circuit 210 receives the corrective d-axis stator current $I_{ds\_corr}$ and adds it to the feed forward d-axis current of the stator, $I_{ds\_feedfw}$ to obtain the d-axis reference current $I_{dref}$. Referring to FIG. 1, the d-axis reference current $I_{dref}$ determined by the exemplary circuit of FIG. 2 may be input as d-axis reference current $I_{dref}$ 100 into first difference circuit 105.

The q-axis reference voltage $V_{q\_ref}$ can be obtained using the following Equation 1:

$$V_{q\,ref} = \sqrt{V_{max}^2 - V_d^2} \qquad \text{(Equation 1)}$$

In Equation 1, $V_{max}^2$ refers to the square of the maximum voltage that can be applied to the motor, and $V_d^2$ is the square of the d-axis voltage. Once the q-axis reference voltage $V_{q\_ref}$ is known, the feed forward d-axis current of the stator, $I_{ds\_feedfw}$ can be determined based on the following Equation (2):

$$I_{ds\_feedfw} = \frac{V_{q\,ref} - \left(r_s \times i_{q\,ref} + L_{qs} \times \frac{di_{q\,ref}}{dt} + E\right)}{\omega \times L_{ds}} \qquad \text{(Equation 2)}$$

In Equation 2, $r_s$ refers to the stator resistance of the motor, $i_{q\,ref}$ refers to the q-axis reference current, $L_{qs}$ refers q-axis inductance of the stator of the motor, $$\frac{di_{q\,ref}}{dt}$$

refers to the derivative of the q-axis reference current with respect to time, E refers to the back electromotive force (EMF) of the motor, ω refers to the electrical speed of the motor, and $L_{ds}$ refers to the d-axis inductance of the stator of the motor. In practice, a low pass digital filter may be used to determine $$\frac{di_{q\,ref}}{dt}$$

and E, depending on the application.

Referring again to FIG. 1, a second difference circuit 115 that receives a reference speed $\omega_{ref}$ of the motor and the measured speed of the motor ω, and outputs the difference between the two signals to PI controller 120. PI controller 120 outputs the q-axis reference current $i_{q\_ref}$ which is used to calculate the feed forward d-axis current of the stator, $I_{ds\_feedfw}$ in Equation 2. A third difference circuit 125 receives the q-axis reference current $i_{q\_ref}$ and the q-axis current of the motor $i_q$, and outputs the difference thereof. As discussed above, the d-axis reference current $I_{dref}$ 100 is input into a first difference circuit 105, which outputs the difference between the d-axis reference current $I_{dref}$ 100 and the d-axis current of the motor $i_d$.

PI controller 130 receives the difference between the q-axis reference current $i_{q\_ref}$ and the q-axis current of the motor $i_q$ output by the third difference circuit 125. The PI controller 130 outputs a q-axis voltage $V_q$, which is input into the difference circuit 200 in FIG. 2. PI controller 135 receives the difference between the d-axis reference current $I_{dref}$ 100 and the d-axis current of the motor $i_d$ output by the first difference circuit 105. PI controller 135 outputs a d-axis voltage $V_d$, which is used to calculate the q-axis reference voltage $V_{q\_ref}$ in Equation 1. The q-axis voltage $V_q$ and the d-axis voltage $V_d$ are input into a first transform 140 that transforms q-axis voltage $V_q$ and the d-axis voltage $V_d$ to $V_\alpha$ and $V_\beta$, respectively, using angle θ, which represents the position of the rotor of the motor 110. Space vector modulator 145 further transforms voltage signals $V_\alpha$ and $V_\beta$ to three-phase voltage signals $V_a$, $V_b$, and $V_c$, which are input into 3-phase bridge 150. The 3-phase bridge 150 outputs three phase currents $i_a$, $i_b$, and $i_c$, which are received by the motor 110. The three phase currents $i_a$, $i_b$, and $i_c$ are input into a second transform 155 that transforms the three phase currents $i_a$, $i_b$, and $i_c$ into current signals $i_\alpha$ and $i_\beta$. The current signals $i_\alpha$ and $i_\beta$ are input into third transform 160, which transforms the current signals $i_\alpha$ and $i_\beta$ into q-axis current $i_q$ and d-axis current $i_d$ based on the position of the rotor θ. The q-axis current $i_q$ and the d-axis current $i_d$ are respectively input into third difference circuit 125 and first difference circuit 105. The positioning and velocity sensing circuit 165 is coupled to the motor 110 and monitors the speed of the motor 110 and the position of the rotor. The positioning and velocity sensing circuit 165 outputs the speed of the motor ω to the second difference circuit 115, and the position of the rotor θ to first and third transforms 140 and 160. The positioning and velocity sensing circuit 165 may be hardware-based, such as an encoder or resolver, or may be software-based, such as speed and angle estimators.

Figure 3:
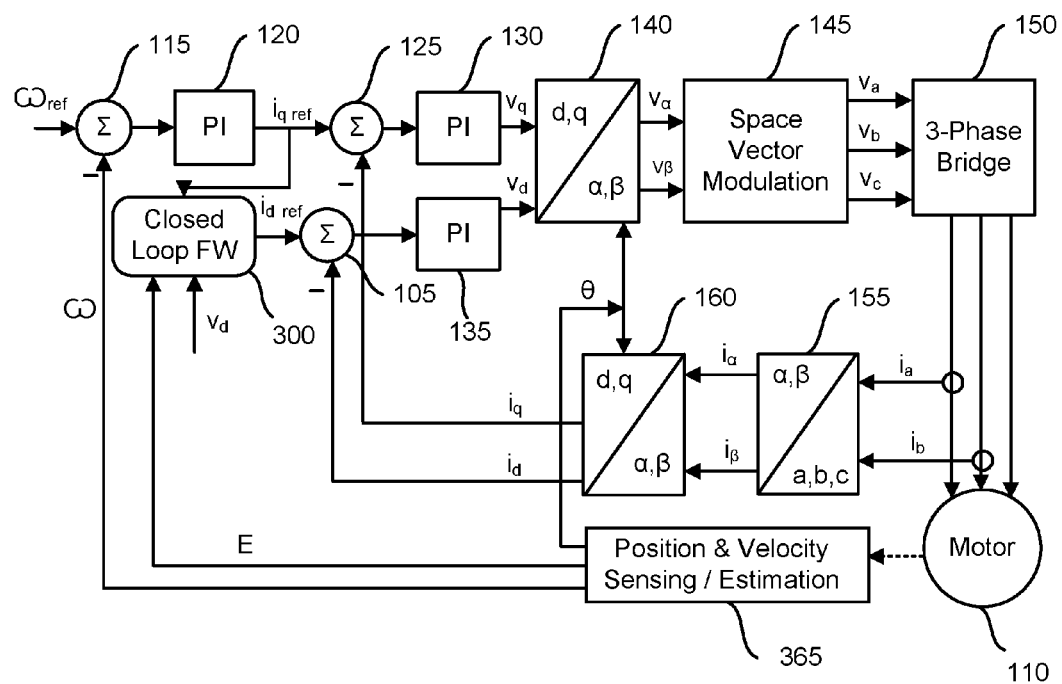
FIG. 3 shows a block diagram of a control circuit for a PMSM according to one or more exemplary embodiments.

FIG. 3 shows a block diagram of a control circuit for a PMSM according to one or more exemplary embodiments. The control circuit shown in FIG. 3 is similar to the control circuit shown in FIG. 1, and therefore only the differences from FIG. 1 will be described here to avoid redundancy. Referring to FIG. 3, the control circuit according to the exemplary embodiment may include a closed loop flux weakening circuit 300 that may include the control circuit shown in FIG. 2. The closed loop flux weakening circuit 300 receives as inputs q-axis reference current $i_{q\_ref}$ and the d-axis voltage $V_d$ to generate the d-axis reference current $i_{d\_ref}$. In addition, like the positioning and velocity sensing circuit 165 of FIG. 1, the position and velocity sensing circuit 365 of FIG. 3 outputs the speed of the motor ω and the position of the rotor θ, but also outputs back EMF E, which is input to the closed loop flux weakening circuit 300 and used to determine the d-axis reference current $i_{d\_ref}$.

Figure 4:
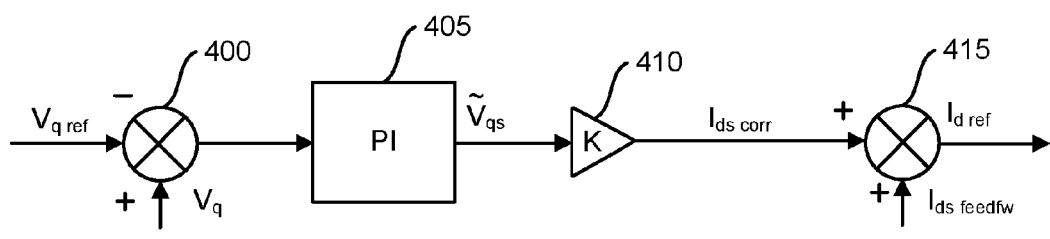
FIG. 4 shows a closed loop flux weakening circuit for determining the d-axis reference current $I_{dref}$ according to another exemplary embodiment.

FIG. 4 illustrates a closed loop flux weakening circuit according to one or more exemplary embodiments. Referring to FIG. 4, the q-axis reference voltage $V_{q\_ref}$ and a q-axis voltage $V_q$ are input to a difference circuit 400, which outputs the difference between the q-axis reference voltage $V_{q\_ref}$ and the q-axis voltage $V_q$ to a PI controller 405. This is similar to the exemplary circuit shown in FIG. 2, except that the q-axis reference voltage $V_{q\_ref}$ is input to the negative terminal of the difference circuit 400, and the q-axis voltage $V_q$ is input to the positive terminal of the difference circuit 400. The PI controller 405 receives the difference between the q-axis reference voltage $V_{q\_ref}$ and a q-axis voltage $V_q$ and outputs a corrective q-axis voltage of the stator $\tilde{V}_{qs}$ near steady state. The corrective q-axis voltage of the stator $\tilde{V}_{qs}$ near steady state is received by gate K 410, which divides the corrective q-axis voltage of the stator $\tilde{V}_{qs}$ near steady state by the product of ω and $L_{ds}$, where ω refers to the electrical speed of the motor, and $L_{ds}$ refers to the d-axis inductance of the stator of the motor, to obtain the corrective d-axis current of the stator $I_{ds\_corr}$. Accordingly, the linearized plant transfer function for the closed loop flux weakening circuit is given as follows in Equation 3:

$$\tilde{V}_{qs} = -\omega \times L_{ds} \times \tilde{I}_{ds} \quad \text{(Equation 3)}$$

In Equation 3, $\tilde{I}_{ds}$ refers to the perturbed d-axis current in the stator near steady state. In the configuration of FIG. 4, the plant transfer function has a unity gain, which allows the closed loop feed forward circuit to be used as part of a control circuit for various motors with minimal tuning of the control circuit. With further referenced to FIG. 4, a summation circuit 415 receives the corrective d-axis stator current $I_{ds\_corr}$ and adds it to the feed forward d-axis current of the stator, $I_{ds\_feedfw}$, to obtain the d-axis reference current $I_{dref}$. The closed loop flux weakening circuit shown in FIG. 4 may be used as the closed loop flux weakening circuit 300 shown in FIG. 3. Alternatively, the closed loop flux weakening circuit shown in FIG. 2 may be used as the closed loop flux weakening circuit 300 shown in FIG. 3.

The exemplary closed loop flux weakening circuits described herein may be embodied in hardware and/or software. For example, the closed loop flux weakening circuits of the exemplary embodiments may be configured to reside in an addressable storage medium and to execute on one or more processors. The exemplary embodiments may include, by way of example, components, such as software components, object-oriented software components, class components and task components, processes, functions, attributes, procedures, subroutines, segments of program code, drivers, firmware, microcode, circuitry, data, databases, data structures, tables, arrays, and variables.

Although the inventive concepts of the present disclosure have been described and illustrated with respect to exemplary embodiments thereof, it is not limited to the exemplary embodiments disclosed herein and modifications may be made therein without departing from the scope of the inventive concepts.

What is claimed is:

1. An apparatus for generating a d-axis reference current used for controlling a motor, the apparatus comprising:
   a difference circuit that obtains a difference between a q-axis reference voltage and a q-axis voltage;
   a controller that converts the difference between the q-axis reference voltage and the q-axis voltage into a corrective d-axis current of a stator of the motor; and
   a summation circuit that obtains the d-axis reference current by adding the corrective d-axis current of the stator of the motor and a feed forward d-axis current of the stator of the motor;
   wherein the q-axis reference voltage, $V_{qref}$, is determined based on the following equation: $V_{qref} = \sqrt{V_{max}^2 - V_d^2}$;
   wherein $V_{max}^2$ is the square of a maximum voltage that can be applied to the motor; and
   wherein $V_d^2$ is the square of a d-axis voltage of the motor; and
   wherein the d-axis reference current is used to control the motor.

2. The apparatus of claim 1, wherein the feed forward d-axis current of the stator of the motor, $I_{ds\_feedfw}$, is determined based on the following equation:

$$I_{ds\_feedfw} = \frac{V_{qref} - \left(r_s \times i_{qref} + L_{qs} \times \frac{di_{qref}}{dt} + E\right)}{\omega \times L_{ds}}$$

wherein, $r_s$ is a stator resistance of the motor;
   wherein, $i_{qref}$ is a q-axis reference current;
   wherein, $L_{qs}$ is a q-axis inductance of the stator of the motor;
   wherein, $$\frac{di_{qref}}{dt}$$

is a derivative of the q-axis reference current with respect to time;
   wherein, E is the back electromotive force of the motor;
   wherein, ω is the electrical speed of the motor; and
   wherein, $L_{ds}$ is the d-axis inductance of the stator of the motor.

3. The apparatus of claim 1, wherein the difference circuit receives the q-axis reference voltage at a positive input of the difference circuit and receives the q-axis voltage at a negative input of the difference circuit.

4. An apparatus for generating a d-axis reference current used for controlling a motor, the apparatus comprising:
   a difference circuit that obtains a difference between a q-axis reference voltage and a q-axis voltage;
   a controller that converts the difference between the q-axis reference voltage and the q-axis voltage into a corrective q-axis voltage of a stator of the motor;
   a gate that converts the corrective q-axis voltage of the stator of the motor into a d-axis current of a stator of the motor; and
   a summation circuit that obtains the reference current by adding the d-axis current of the stator of the motor and a feed forward d-axis current of the stator of the motor;
   wherein the q-axis reference voltage, $V_{qref}$, is determined based on the following equation: $V_{qref} = \sqrt{V_{max}^2 - V_d^2}$;

wherein $V_{max}^2$ is the square of a maximum voltage of the motor;

wherein $V_d^2$ is the square of a d-axis voltage of the motor; and wherein the d-axis reference current is used to control the motor.

5. The apparatus of claim 4, wherein the feed forward d-axis current of the stator of the motor, $I_{ds\_feedfw}$, is determined based on the following equation:

$$I_{ds\_feedfw} = \frac{V_{q\,ref} - \left(r_s \times i_{q\,ref} + L_{qs} \times \frac{di_{q\,ref}}{dt} + E\right)}{\omega \times L_{ds}}$$

wherein, $r_s$ is a stator resistance of the motor;
wherein, $i_{q\,ref}$ is a q-axis reference current;
wherein, $L_{qs}$ is a q-axis inductance of the stator of the motor;
wherein, $$\frac{di_{q\,ref}}{dt}$$

is a derivative of the q-axis reference current with respect to time;

wherein, E is the back electromotive force of the motor;
wherein, $\omega$ is the electrical speed of the motor; and
wherein, $L_{ds}$ is the d-axis inductance of the stator of the motor.

6. The apparatus of claim 4, wherein the difference circuit receives the q-axis reference voltage at a negative input of the difference circuit and receives the q-axis voltage at a positive input of the difference circuit.

7. The apparatus of claim 4, wherein the gate converts the q-axis voltage of the stator of the motor into a d-axis current of a stator of the motor by dividing the q-axis voltage of the stator of the motor by the product of an electrical speed of the motor and a d-axis inductance of the stator of the motor.

8. A method for generating a d-axis reference current used for controlling a motor, the method comprising:

obtaining, by a difference circuit, a difference between a q-axis reference voltage and a q-axis voltage of the motor;

converting, by a controller, the difference between the q-axis reference voltage and the q-axis voltage into a d-axis corrective current of a stator of the motor;

determining, by a summation circuit, the d-axis reference current by adding the d-axis corrective current of the stator of the motor and a feed forward d-axis current of the stator of the motor; and wherein determining the q-axis reference voltage, $V_{qref}$, is based on the following equation: $V_{qref} = \sqrt{V_{max}^2 - V_d^2}$;

wherein $V_{max}^2$ is the square of a maximum voltage of the motor and $V_d^2$ is the square of a d-axis voltage of the motor; and wherein the d-axis reference current is use to control the motor.

9. The method of claim 8, wherein the converting the difference between the q-axis reference voltage and the q-axis voltage into a d-axis current of a stator of the motor comprises:

converting the difference between the q-axis reference voltage and the q-axis voltage into a q-axis voltage of the stator of the motor; and converting the q-axis voltage of a stator of the motor into a d-axis current of the stator of the motor.

10. The method of claim 8, further comprising determining the feed forward d-axis current of the stator of the motor, $I_{ds\_feedfw}$, based on the following equation:

$$I_{ds\_feedfw} = \frac{V_{q\,ref} - \left(r_s \times i_{q\,ref} + L_{qs} \times \frac{di_{q\,ref}}{dt} + E\right)}{\omega \times L_{ds}}$$

wherein, $r_s$ is a stator resistance of the motor;
wherein, $i_{q\,ref}$ is a q-axis reference current;
wherein, $L_{qs}$ is a q-axis inductance of the stator of the motor;
wherein, $$\frac{di_{q\,ref}}{dt}$$

is a derivative of the q-axis reference current with respect to time;

wherein, E is the back electromotive force of the motor;
wherein, $\omega$ is the electrical speed of the motor; and
wherein, $L_{ds}$ is the d-axis inductance of the stator of the motor.

* * * * *